United States Patent
Lee (10) Patent No.: US 11,513,033 B2
(45) Date of Patent: Nov. 29, 2022

(54) GAS TURBINE ENGINE SYSTEM WITH HEALTH MONITORING OF FUEL PUMP CONDITION

(71) Applicant: Rolls-Royce Corporation, Indianapolis, IN (US)

(72) Inventor: Andrew C. S. Lee, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 386 days.

(21) Appl. No.: 16/281,785

(22) Filed: Feb. 21, 2019

(65) Prior Publication Data

US 2020/0271547 A1 Aug. 27, 2020

(51) Int. Cl.
*G01M 15/14* (2006.01)

(52) U.S. Cl.
CPC ......... *G01M 15/14* (2013.01); *F05D 2220/32* (2013.01); *F05D 2260/80* (2013.01); *F05D 2260/82* (2013.01); *F05D 2270/306* (2013.01); *F05D 2270/335* (2013.01)

(58) Field of Classification Search
None
See application file for complete search history.

(56) References Cited

U.S. PATENT DOCUMENTS

| 2,670,598 | A | * | 3/1954 | Van Millingen | F02C 3/36 60/39.15 |
| 3,444,875 | A | * | 5/1969 | Rowe | F04D 27/0253 137/88 |
| 5,012,840 | A | | 5/1991 | Betzler | |
| 5,111,653 | A | | 5/1992 | Leeson | |
| 5,563,351 | A | | 10/1996 | Miller | |
| 5,817,950 | A | * | 10/1998 | Wiklund | G01F 1/46 73/861.66 |
| 6,176,076 | B1 | | 1/2001 | Ford | |
| 6,684,163 | B2 | | 1/2004 | Antoine et al. | |
| 7,204,076 | B2 | | 4/2007 | Griffiths et al. | |
| 8,528,420 | B2 | | 9/2013 | Benson et al. | |
| 8,601,822 | B2 | | 12/2013 | Paradise | |
| 8,839,769 | B2 | | 9/2014 | Sasai et al. | |
| 8,919,094 | B2 | | 12/2014 | Haugsjaahabink | |
| 9,546,628 | B2 | | 1/2017 | Sanborn et al. | |
| 10,428,744 | B2 | | 10/2019 | Veilleux | |
| 2010/0305880 | A1 | * | 12/2010 | Oddie | G01F 1/44 73/861.63 |
| 2012/0210716 | A1 | | 8/2012 | Weir et al. | |
| 2012/0219429 | A1 | * | 8/2012 | Heitz | F04B 49/22 417/44.1 |
| 2012/0227707 | A1 | | 9/2012 | Sasai et al. | |
| 2015/0027412 | A1 | * | 1/2015 | Henson | F02C 7/236 123/457 |
| 2018/0163966 | A1 | | 6/2018 | Jones et al. | |

FOREIGN PATENT DOCUMENTS

| EP | 1138933 | A2 | | 4/2001 |
| EP | 1380796 | A2 | | 1/2004 |
| JP | 11108712 | A | * | 4/1999 |

* cited by examiner

*Primary Examiner* — Matthew G Marini
(74) *Attorney, Agent, or Firm* — Barnes & Thornburg LLP (57) ABSTRACT

A gas turbine engine propulsion system includes a gas turbine engine, a fuel storage tank and a pump unit. The gas turbine engine provides propulsive forces to move a vehicle. The fuel storage tank stores a fuel that can be used to power the gas turbine engine. The pump unit displaces a fuel flow from the fuel storage tank and delivers the fuel flow to the gas turbine engine.

12 Claims, 4 Drawing Sheets

GAS TURBINE ENGINE SYSTEM WITH HEALTH MONITORING OF FUEL PUMP CONDITION

TECHNICAL FIELD

The present disclosure relates to a gas turbine engine propulsion system, particularly those including a gas turbine engine. More particularly, the present disclosure relates to a fluid pump for a gas turbine engine.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines typically require a fuel source that is combusted during operation of the gas turbine engine. The fuel source may be stored in a tank and pumped from the tank to the combustor of the gas turbine engine. The pumps used to deliver the fuel to the gas turbine engine may degrade over time and may be replaced at predetermined service intervals. In some instances, the pumps have useable life remaining when they are replaced at a predetermined time interval.

SUMMARY

The present disclosure may comprise one or more of the following features and combinations thereof.

According to a first aspect of the present disclosure, gas turbine engine propulsion system includes a gas turbine engine, a fuel-storage tank, a pump unit, and a control system. The gas turbine engine includes a compressor configured to pressurize air, a combustor configured to mix fuel and the pressurized air from the compressor and combust the mixture of fuel and air to provide hot gases, and a turbine configured to be driven by the hot gases during operation of the gas turbine engine. The fuel-storage tank is configured to hold the fuel for consumption by the gas turbine engine.

In some embodiments, the pump unit includes: (i) at least one fuel pump configured to displace a first fuel flow from the fuel-storage tank that is divided downstream of the fuel pump to provide a second fuel flow transferred to the combustor through a main-flow circuit and a third fuel flow recirculated back to the fuel pump through a spill-flow circuit, and (ii) at least one pump-health monitoring sensor fluidly coupled to the fluid pump and configured to provide signals indicative of fluid flow conditions of at least one of the first fuel flow and the third fuel flow. The control system is coupled to the at least one sensor and includes a processor and memory storing instructions therein. The control system is configured to receive the signals and output a command signal configured to cause a notification that informs a user of an anticipated end of useful life so that the fuel pump can be replaced prior to the end of useful life.

In some embodiments, the control system is configured to determine a flow rate of the third fuel flow in the spill-flow circuit and is configured to send the command signal when the flow rate through the spill-flow circuit reaches a predetermined flow rate. The predetermined flow rate is greater than or equal to a flow rate through the spill flow circuit that, when combined with the second fuel flow, allows the gas turbine engine to operate at maximum capacity.

In some embodiments, the control system is configured to compare the flow rate to fuel pump performance over the life of the fuel pump and is configured to determine and set the predetermined flow rate based on a rate of change of the flow rate through the spill-flow circuit and fuel pump performance over the life of the fuel pump.

In some embodiments, the control system is configured to compare the flow rate to fuel pump performance over the life of the fuel pump and is configured to determine and set the predetermined flow rate based on a rate of change of the flow rate and fuel pump performance over the life of the fuel pump.

In some embodiments, the pump unit includes a first sensor coupled to the spill-flow circuit and configured to provide a first signal indicative of fluid flow conditions of the third fuel flow and a second sensor coupled to the main-flow circuit and configured to provide a first signal indicative of fluid flow conditions of the first fuel flow.

In some embodiments, the sensor includes a pitot static tube configured to measure the dynamic pressure of at least one of the first fuel flow and the third fuel flow and the control system is configured to calculate a flow rate of the at least one of the first fuel flow and the third fuel flow based on the dynamic pressure.

In some embodiments, at least one of the main-flow circuit and the spill flow circuit includes a conduit having a first section with a first diameter and a second section second conduit with a second diameter smaller than the first diameter. The sensor includes a pitot static tube configured to measure the dynamic pressure of the at least one of the first fuel flow and the third fuel flow in the second section and the control system is configured to calculate a flow rate of the at least one of the first fuel flow and the third fuel flow.

In some embodiments, the sensor includes a flow meter including an impeller located in at least one of the main-flow circuit and the spill-flow circuit and an electromagnetic device configured to measure a rotational speed of the impeller and the control system is configured to calculate a flow rate of the fuel flow in the at least one of the main-flow circuit and the spill-flow circuit based on the rotational speed of the impeller.

In some embodiments, the notification includes a visual display that is activated upon receipt of the command signal. The control system is configured to monitor the degradation of the at least one fuel pump and provide a command signal to update the visual display in real time.

According to another aspect of the present disclosure, a pump unit for use in a gas turbine engine includes at least one fuel pump and at least one pump health monitoring sensor. The fuel pump is configured to displace a first fuel flow from a fuel-storage tank that is divided downstream of the fuel pump to provide a second fuel flow through a main-flow circuit and a third fuel flow recirculated back to the fuel pump through a spill-flow circuit. At least one pump-health monitoring sensor is fluidly coupled along the spill-flow circuit and is configured to provide a signals indicative of fluid flow conditions of the third fuel flow in the spill-flow circuit.

In some embodiments, the pump unit is configured to output a notification that informs a user of an anticipated end of useful life so that the fuel pump can be replaced prior to the end of useful life when the fluid flow conditions measured by the sensor reach a predetermined threshold.

In some embodiments, the pump unit further includes a control system coupled to the at least one sensor and including a processor and memory storing instructions therein and configured to receive the signals and output a command signal to cause the notification. The control system is configured to determine a flow rate of the third fuel flow in the spill-flow circuit and is configured to send the command signal when the flow rate through the spill-flow circuit reaches the predetermined threshold.

According to another aspect of the present disclosure, a method includes: installing a fuel pump in a gas turbine engine; displacing a fuel flow through a main-flow circuit using the fuel pump; recirculating a portion of the fuel flow through a spill-flow circuit back to the fuel pump; sensing fluid flow conditions of the portion of the fuel flow in the spill-flow circuit; and providing a notification that informs a user of an anticipated end of useful life so that the fuel pump can be replaced prior to the end of useful life based at least in part on the fluid flow conditions of the portion of the fuel flow in the spill-flow circuit.

In some embodiments, the step of sensing includes determining a change in flow rate of the portion of the fuel flow in the spill-flow circuit based on the fluid flow conditions over the life of the fuel pump, and the step of providing a notification occurs when the flow rate of the portion of the fuel flow in the spill-flow circuit reaches a predetermined threshold.

These and other features of the present disclosure will become more apparent from the following description of the illustrative embodiments.

BRIEF DESCRIPTION OF THE DRAWINGS

The detailed description particularly refers to the accompanying figures in which.

DETAILED DESCRIPTION

For the purposes of promoting an understanding of the principles of the disclosure, reference will now be made to a number of illustrative embodiments illustrated in the drawings and specific language will be used to describe the same.

Figure 1:
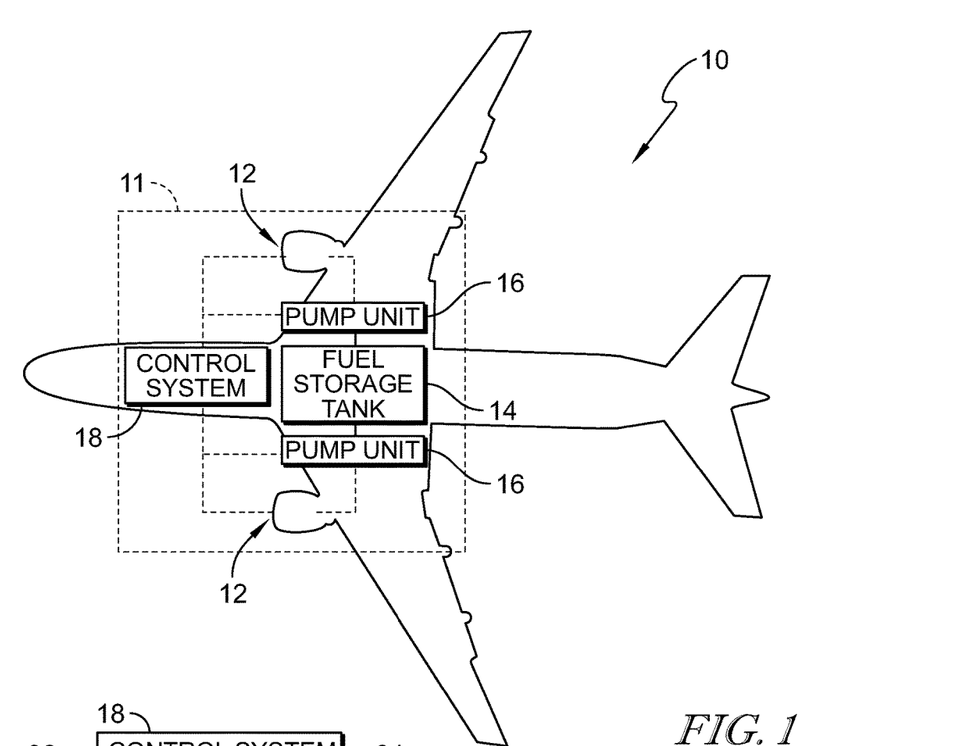
FIG. 1 is a top view of an illustrative aircraft including a pair of pump units each having a fluid pump configured to deliver fuel to a respective gas turbine engine and a control system configured to regulate operation of the pump units and to monitor the condition of the fluid pumps.

An illustrative vehicle 10 embodied as an aircraft is shown in FIG. 1. The vehicle 10 includes a gas turbine propulsion system 11 that is configured to provide propulsive forces to move the vehicle 10. The gas turbine propulsion system 11 includes at least one gas turbine engine 12, a fuel storage tank 14, and a pump unit 16 configured to displace fuel from the fuel storage tank 14 to the gas turbine engine 12 for combustion. The gas turbine engine 12 may include a turbojet, turboprop, or a turbofan type gas turbine engine 12. The illustrative aircraft shown in FIG. 1 includes two gas turbine engines 12 and respective pump units 16 for each gas turbine engine 12. The vehicle 10 further includes a control system 18 coupled to each of the gas turbine engines 12 and the pump units 16 to regulate the operation of each.

Figure 2:
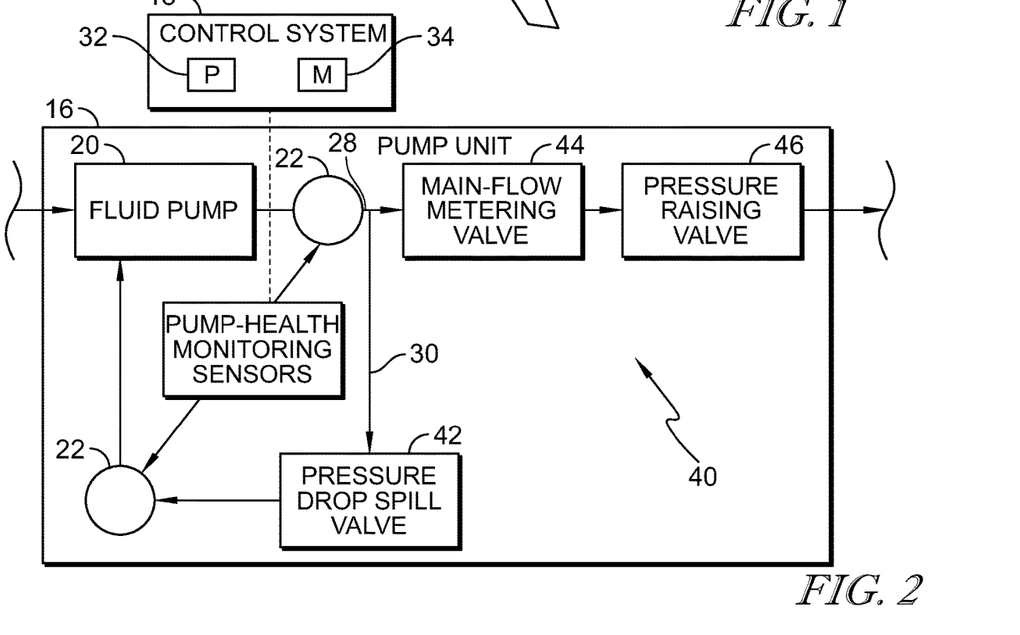
FIG. 2 is a diagrammatic view of one of the pump units of FIG. 1 showing that the pump unit further includes a pump health monitoring sensor and showing that the control system is configured to receive signals from the health monitoring sensor and output a command signal to cause a notification that informs a user of an anticipated end of useful life of the fluid pump.

The pump unit 16 is diagrammatically shown in FIG. 2 and includes at least one fluid pump 20 and at least one pump health monitoring sensor 22. The fluid pump 20 is configured to displace fuel from the fuel storage tank 14 and deliver the fuel to the gas turbine engine 12 through a main-flow circuit 28. During operation of the gas turbine engine 12, the fluid pump 20 displaces a first fuel flow from the fuel storage tank 14 in response to an output of the gas turbine engine 12. The first fuel flow is pushed through the main-flow circuit 28 and it is divided into a second fuel flow that is delivered to the gas turbine engine 12 and a third fuel flow that is recirculated through a spill-flow circuit 30 back to the fluid pump 20. The health monitoring sensor 22 is fluidly coupled to at least one of the main-flow circuit 28 and the spill-flow circuit 30.

The control system 18 includes a processor 32 and memory 34 storing instructions that cause the control system 18 to operate in the manner described as shown in FIG. 2. The control system 18 provides all of the functionality needed to control the operation of the gas turbine propulsion system 11 and monitors the condition of the fluid pump 20 at the same time. In the illustrative embodiment, the control system 18 is an engine control system. In another embodiment, the pump unit 16 may include a designated control system programed only to monitor the condition of the fluid pump 20.

The pump health monitoring sensor 22 is configured to provide signals indicative of the fluid flow conditions provided by the fluid pump 20. In one example, the pump health monitoring sensor 22 is configured to measure fluid flow conditions of the first fuel flow in the main-flow circuit 28. In another example, the pump health monitoring sensor 22 is configured to measure fluid flow conditions of the third fuel flow in the spill-flow circuit 30. The control system 18 is configured to evaluate the signals from the health monitoring sensor 22 and issue notifications in response to the evaluation as shown in the flowchart in FIG. 3. The control system 18 constantly receives signals from the health monitoring sensor 22 at step 100. The control system 18 then uses the signals to determine a flow rate of at least one of the first and third fuel flows at step 102. Alternatively, the health monitoring sensor 22 may directly measure the flow rate and output signals to the control system 18 indicative of the flow rate measured by the health monitoring sensor 22. Over time, degradation of the fluid pump 20 causes the flow rate of fuel provided by the fluid pump 20 to decline. At the same time, the degradation of the fluid pump 20 may cause the fluid pump to increase output to keep up with fuel demands of the gas turbine engine 12.

Figure 3:
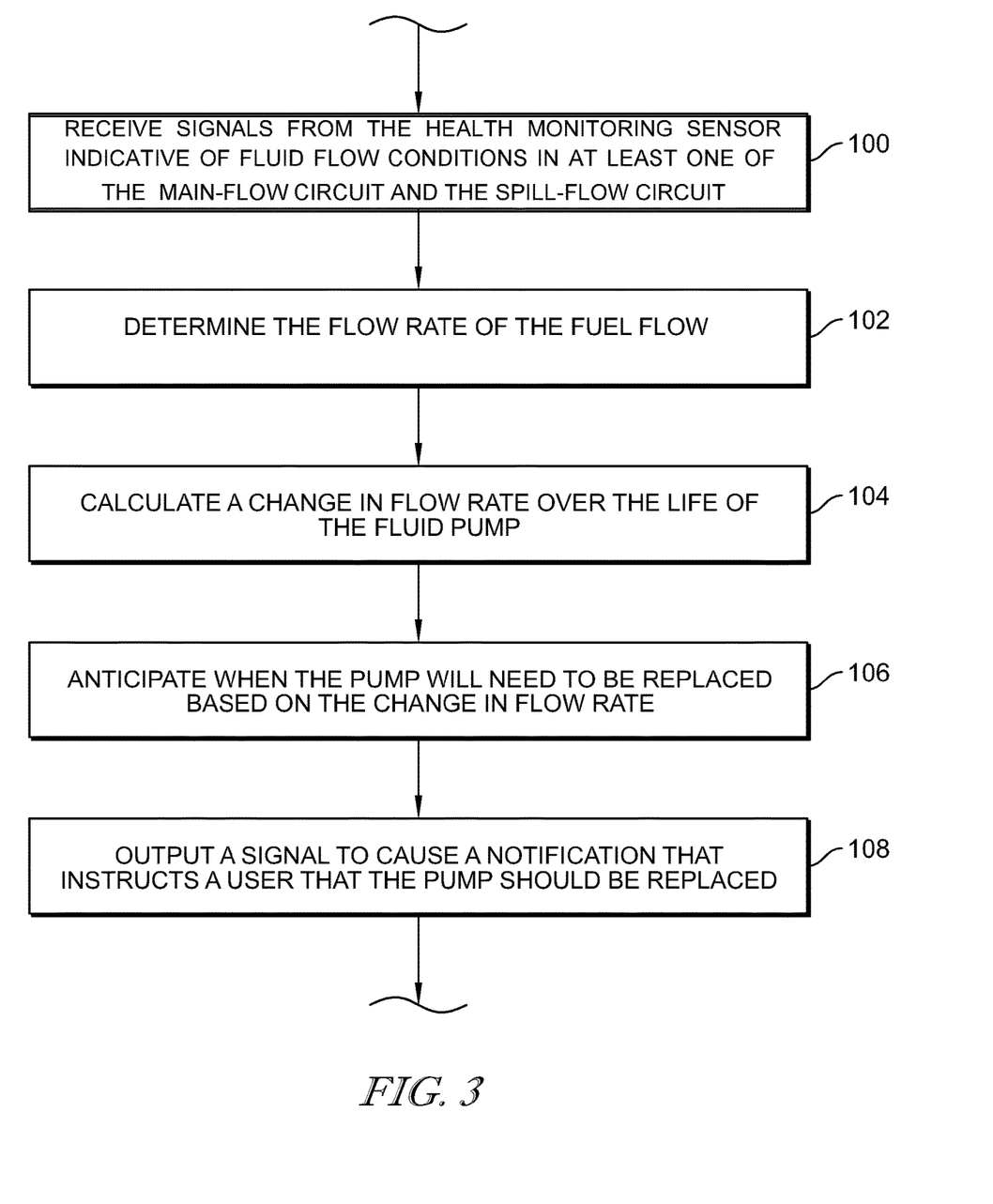
FIG. 3 is a flow chart describing how the health monitoring sensor and the control system monitor the fluid pump and output notifications to instruct a user to replace the fluid pump at the end of useful life.

The control system 18 evaluates the signals over the life of the fluid pump 20 to calculate a rate of change of the fuel flow rate at step 104. The control system 18 is programmed with software that is able to process the signals from the health monitoring sensor 22 and converts the signals to flow rate using either the relationship between the dynamic pressure and flow speed or that between impeller's rotational speed and flow speed as will be described in greater detail below. The rate of change of the fuel flow rate over the life of the fuel pump 20 is directly related to degradation of the fluid pump 20.

Based on the calculations performed using the signals from the health monitoring sensor 22, the control system 18 is able to anticipate when the fluid pump 20 will need to be replaced by extrapolating the rate of change of the fuel flow rate through at least one of the main-flow circuit 28 and the spill-flow circuit 30 at step 106. The control system 18 is then configured to output a command signal to cause a notification that informs a user of the anticipated end of useful life of the fluid pump 20 so that the fluid pump 20 can be replaced prior to the end of useful life at step 108.

In some instances, the gas turbine engine 12 may operate at a maximum capacity such that the gas turbine engine 12 requires a corresponding maximum fuel flow. As fuel flow to the gas turbine engine 12 increases, the third fuel flow in the spill-flow circuit 30 decreases to compensate for the greater need. However, the degradation of the fluid pump 20 may compromise the pump unit's 16 ability to deliver the maximum fuel flow to the gas turbine engine 12. Once the flow rate of the third fuel flow in the spill-flow circuit 30 reaches a threshold level, the fluid pump 20 may be unable to meet the demands of the gas turbine engine 12 at maximum capacity. Typical fluid pumps are replaced at predetermined time intervals for this reason.

In the illustrative embodiment, the pump unit 16 uses the health monitoring sensor 22 to constantly monitor the flow rate of at least one of the first fuel flow and the third fuel flow. The control system 18 is configured to send the command signal to cause the notification when the flow rate through the spill-flow circuit 30 reaches a predetermined threshold or flow rate. In one embodiment, the predetermined flow rate is greater than or equal to the threshold level through the spill flow circuit 30 that allows the gas turbine engine to operate at maximum capacity. Monitoring the flow rate of the first and/or third fuel flows and providing a notification when the predetermined flow rate is reached may decrease the costs of replacing the fluid pump 20 at predetermined time intervals. Monitoring the flow rate of the first and/or third fuel flows may also increase an average time between services.

In another embodiment, the control system 18 is configured to determine the predetermined flow rate based on a rate of change of the flow rate and pump performance over the life of the fluid pump 20. For example, if the fluid pump 20 operates at a relatively high level early in its life, degradation of the fuel pump 20 and change in flow rate may also be high. The control system 18 monitors these conditions based on the comparison between the change in flow rate and pump performance to anticipate when the predetermined flow rate will be achieved. The control system 18 then outputs the command signal to cause a notification that informs a user of an anticipated end of useful life so that the fuel pump can be replaced prior to the end of useful life.

The notification may be a visual and/or an audible notification. Additionally, the notification may be displayed only when the predetermined flow rate has been reached or may be constantly displayed and updated in real time. In one example, the notification is provided by visual indication, such as a light, that is illuminated in the aircraft's cockpit. In another example, the notification is provided by a visual indication that is displayed remotely such as on a monitor used by an operator in an air traffic controller tower. In yet another example the notification includes a numerical and/or an iconic representation of useful life remaining for the fluid pump 20.

Figure 4:
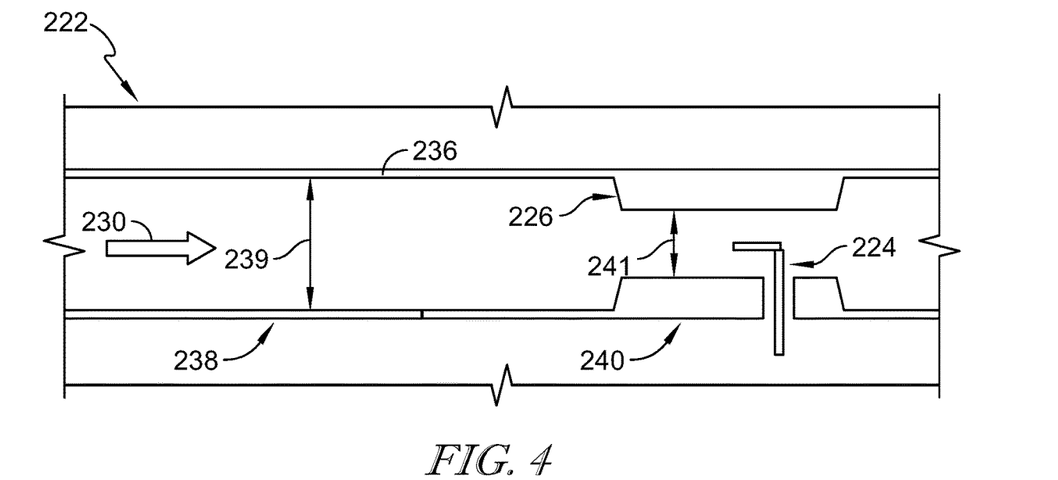
FIG. 4 is a cross sectional view of a conduit and a first embodiment of the health monitoring sensor of FIG. 2 showing that the health monitoring sensor is provided by a pitot static tube that is configured to measure the dynamic pressure of the fuel flow in the conduit.

A first embodiment of a health monitoring sensor 222 is shown in FIG. 4 and is provided by at least a first pitot static tube 224. The pitot static tube 224 extends into a conduit of the main and/or spill flow circuits 28, 30 to measure the dynamic pressure of fuel flow 230. The pitot static tube 224 is coupled to the control system 18 and provides signals indicative of the dynamic pressure of the fuel flow throughout the life of the fluid pump 20. The control system 18 receives the signals from the pitot static tube 224 and converts the dynamic pressure to the flow speed using the Bernoulli principle. The flow rate can be calculated using this flow speed combined with the cross sectional area of the passage and the density of the fluid. This algorithm or predetermined calibration that contains algebraic relationships between the dynamic pressure and flow speed and/or flow rate can be stored as software in the memory 34 and processed by the processor 32 using the signals from the pitot static tube 224. Known properties, such as a diameter of the conduit 236 and dimensions of the sensor 222 may also be stored in the memory 34 and used in the conversion.

The health monitoring sensor may further include a restrictor 226. The conduit 236 has a first section 238 with a first diameter 239 and a second section 240 with a second diameter 241 that is narrower than the first diameter 239 to accelerate the fuel flow 230 in the second section 240. The restrictor 226 is positioned in the section 240 to provide the second diameter 241. In the illustrative embodiment, the pitot static tube 224 lies in the second section 240 to measure the dynamic pressure of the accelerated fuel flow 230. The restrictor 226 may be formed in the conduit 236 or may be a separate component that is added to the conduit 236 to retrofit the pump unit 16.

Figure 5:
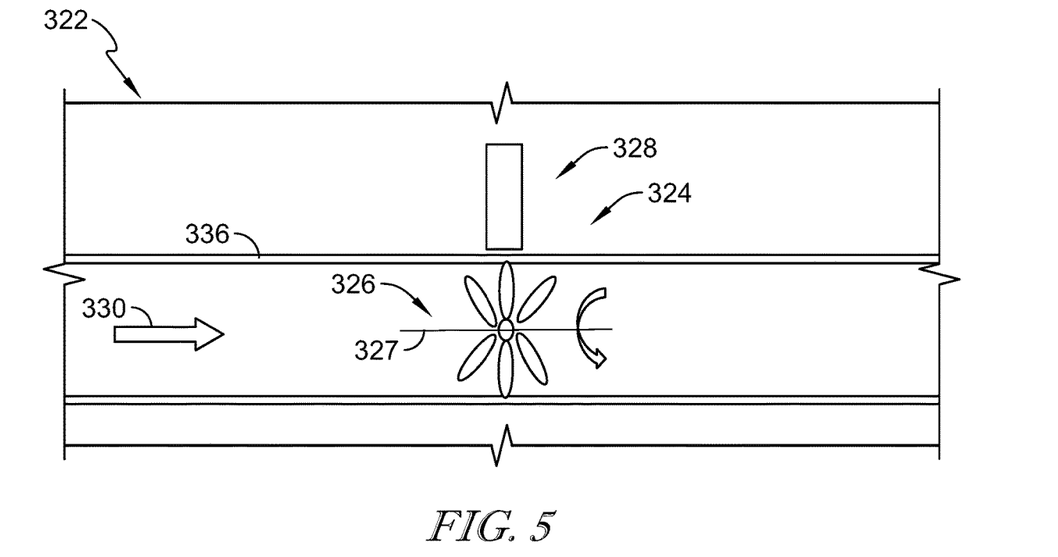
FIG. 5 is a cross sectional view of a conduit and a second embodiment of the health monitoring sensor of FIG. 2 showing that the health monitoring sensor is provided by an impeller located in the conduit and an electromagnetic device configured to measure a rotational speed of the impeller and located outside of the conduit and aligned radially with the impeller.

A second embodiment of a health monitoring sensor 322 is shown in FIG. 5 and is provided by a flow meter 324. The flow meter 324 includes an impeller 326 that lies within a conduit 336 of the main flow and/or spill-flow circuits, and an electromagnetic pick-off device 328 positioned outside of the conduit 336. The impeller 326 rotates about an axis 327 as the third fuel flow 330 travels through the spill-flow circuit 30. The electromagnetic device 328 measures the frequency of the rotation of the impeller 326 and provides signals indicative of that frequency. The control system 18 receives the signals from the flow meter 324 and uses the frequency of the impeller with predetermined relationship between the frequency and the flow speed and/or flow rate to calculate the flow rate of the first and/or third fuel flows. Known properties of the spill-flow circuit 30, such as a diameter of the conduit 336 and dimensions of the sensor 322 may also be stored in the memory 34 and used in the calculation.

Figure 6:
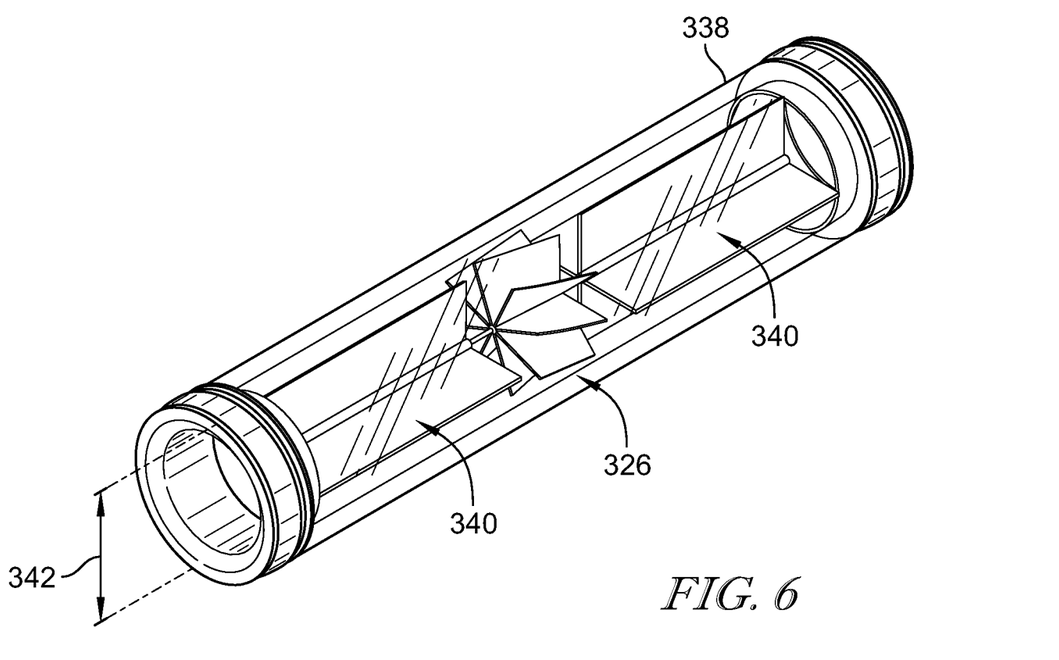
FIG. 6 is a perspective view of a portion of the second embodiment of the health monitoring sensor including a cartridge used to house at least a portion of the health monitoring sensor.

The flow meter 324 may further include a cartridge 338 and at least one strainer 340 as shown in FIG. 6. The cartridge 338 is illustratively embodied as a tube that has an outer diameter 342 that is slightly smaller than an inner diameter of the conduit 336 so that the cartridge 338 can fit within the main flow circuit 28 and/or spill-flow circuit 30. The cartridge 338 houses a portion of the flow meter 324 to facilitate installation of the flow meter 324 in the flow circuit. The at least one strainer 340 is configured to stabilize the third fuel flow 330 upstream of the impeller 326. The impeller 326 is coupled to the at least one strainer 340 within the cartridge 338 and positioned directly downstream of the at least one strainer 340 to receive the stabilized fuel flow. An additional strainer 340 may be coupled to the impeller 326 downstream of the impeller 326.

In the illustrative embodiment, the pump unit 16 further includes a plurality of valves 40 coupled along the main-flow circuit 28 and the spill-flow circuit 30 as shown in FIG. 2. The plurality of valves 40 include a pressure drop spill valve 42, a main-metering valve 44 and a pressure raising valve 46. The pressure drop spill valve 42 is configured to maintain a constant pressure differential across the main metering valve 44 by increasing or decreasing flow through the spill-flow circuit 30. The main-metering valve 44 is configured to deliver a proper amount of fuel to the gas turbine engine 12 based on operating conditions. The pressure raising valve 46 is configured to increase pressure of the fuel flow to the gas turbine engine to compensate for pressure drops caused by the other valves 40. In the illustrative embodiment, the health monitoring sensor 22 may be coupled to the main-flow circuit 28 upstream of the pressure drop spill valve 42 or to the spill-flow circuit 30 downstream of the pressure drop spill valve 42.

In the illustrative embodiment, the pressure drop spill valve 42 is a mechanical valve. In other embodiments, the pressure drop spill valve may be an active valve that is controlled by the control system 18. The constant pressure differential maintained across the main metering valve is equal to about 70 psi in the illustrative embodiment, however, any suitable pressure differential may be used depending on the type of engine the pump unit 16 is serving.

In illustrative embodiments, the pump unit 16 (FPMU) may include a low pressure gear pump and a high pressure gear pump. The high pressure (HP) gear pump 20 may be designed to have a reserve flow capacity throughout the operation. This means that the HP gear pump 20 is delivering more fuel than is demanded by the combustor and compressor variable geometry (CVG) system (i.e. gas turbine engine 12). The excess fuel is continuously extracted from an upstream location of the main metering valve (MMV) 44 and returned to the inlet of the HP gear pump 20.

In illustrative embodiments, components of gear pump 20 may degrade over time due to wear and cavitation. Degraded gear pumps are expected to reduce the aforementioned excess capacity or spill flow. FPMUs may be removed for services at pre-set intervals rather than by necessities. The present disclosure describes a pump unit 16 that measures the spill flow rate to enable operators to determine which FPMUs are at risk for failures. This may bring savings to the operational costs by extending the mean time between services (MTBS) of healthier FPMUs.

In illustrative embodiments, the pump unit 16 includes a sensor 22 to measure the dynamic pressure of the fuel flow in the spill path using methods that are based on principles of fluid dynamics: Bernoulli principle and Venturi effect. In illustrative embodiments, some examples of flow measurement devices that utilizes these principles are Pitot-static pressure probe and Venturi tube flow meters. The difference between pressures can be detected by differential pressure transducers that are used in engines. The signals from the transducer can be monitored and used by the engine control system to determine the condition of the FPMU. The flow rate of the fuel in the spill flow can be measured directly using flowmeters or estimated indirectly based on its density, speed, and cross-sectional area.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine propulsion system comprising
a gas turbine engine including a compressor configured to pressurize air, a combustor configured to mix fuel and the pressurized air from the compressor and combust the mixture of fuel and air to provide hot gases, and a turbine configured to be driven by the hot gases during operation of the gas turbine engine,
a fuel-storage tank configured to hold the fuel for consumption by the gas turbine engine,
a pump unit including: (i) at least one fuel pump configured to displace a first fuel flow from the fuel-storage tank that is divided downstream of the fuel pump to provide a second fuel flow transferred to the combustor through a main-flow circuit and a third fuel flow recirculated back to the fuel pump through a spill-flow circuit, and (ii) a first sensor coupled to the spill-flow circuit and configured to provide a first signal indicative of fluid flow conditions of the third fuel flow, and (iii) a second sensor coupled to the main-flow circuit between the at least one fuel pump and an inlet to the spill-flow circuit and configured to provide a second signal indicative of fluid flow conditions of the first fuel flow, and
a control system coupled to the first and second sensors and including a processor and memory storing instructions therein,
wherein the control system is configured to receive the first and second signals and output a command signal configured to cause a notification that informs a user of an anticipated end of useful life so that the fuel pump can be replaced prior to the end of useful life,
wherein the spill flow circuit includes a conduit having a first section with a first diameter and a second section with a second diameter smaller than the first diameter,
wherein the first sensor includes a pitot static tube coupled to the second section and extending into an interior defined by the second section to measure a dynamic pressure of the third fuel flow in the second section and the control system is configured to calculate a flow rate of the third fuel flow based on the dynamic pressure of the third fuel flow, and
wherein the pump unit further comprises a plurality of valves including a pressure drop spill valve coupled to the spill-flow circuit and arranged downstream of the second sensor and upstream of the first sensor, a main-metering valve coupled to the main-flow circuit and arranged to lie upstream of the second sensor, and a pressure raising valve coupled to the main-flow circuit and arranged upstream of the main-metering valve, the pressure drop spill valve being configured to maintain a constant pressure differential across the main metering valve by adjusting flow through the spill-flow circuit, the main-metering valve being configured to deliver the first fuel flow to the gas turbine engine based on operating conditions, the pressure raising valve being configured to increase pressure of the first fuel flow to the gas turbine engine.

2. The system of claim 1, wherein the control system is configured to determine a flow rate of the first fuel flow and the flow rate of the third fuel flow and is configured to send the command signal when the flow rate of the third fuel flow reaches a predetermined flow rate.

3. The system of claim 2, wherein the predetermined flow rate is greater than or equal to a flow rate through the spill flow circuit that, when combined with the second fuel flow, allows the gas turbine engine to operate at maximum capacity.

4. The system of claim 2, wherein the control system is configured to compare the flow rate of the third fuel flow and the flow rate of the first fuel flow to fuel pump performance over the life of the fuel pump and is configured to determine and set the predetermined flow rate based on a rate of change of the flow rate and fuel pump performance over the life of the fuel pump.

5. The system of claim 1, wherein the second sensor includes a pitot static tube configured to measure a dynamic pressure of the first fuel flow and the control system is configured to calculate a flow rate of the first fuel flow based on the dynamic pressure of the first fuel flow.

6. The system of claim 1, wherein the notification includes a visual display that is activated upon receipt of the command signal.

7. The system of claim 1, wherein the control system is configured to monitor the degradation of the at least one fuel pump and provide a command signal to update the visual display in real time.

8. The system of claim 1, wherein the first sensor is coupled to a conduit downstream of the pressure drop spill valve and is configured to determine at least one of pressure and flow rate of the third fuel flow in the conduit.

9. A pump unit for use in a gas turbine engine, the pump unit comprising
at least one fuel pump configured to displace a first fuel flow from the fuel-storage tank that is divided downstream of the fuel pump to provide a second fuel flow through a main-flow circuit and a third fuel flow recirculated back to the fuel pump through a spill-flow circuit,
a first sensor fluidly coupled along the spill-flow circuit and configured to provide signals indicative of fluid flow conditions of the third fuel flow in the spill-flow circuit,
a second sensor fluidly coupled along the main-flow circuit between the fuel pump and an inlet to the spill-flow circuit, the second sensor configured to provide signals indicative of fluid flow conditions of the first fuel flow, and
a control system coupled to the first sensor and the second sensor and including a processor and memory storing instructions therein,
wherein the control system is configured to determine a flow rate of the third fuel flow in the spill-flow circuit based on the signals from the first sensor and a flow rate of the first fuel flow in the main-flow circuit based on the signals from the second sensor, and the control system is configured to send a command signal when the flow rate through the spill-flow circuit reaches a predetermined threshold,
wherein the pump unit is configured to output a notification that informs a user of an anticipated end of useful life so that the fuel pump can be replaced prior to the end of useful life when the fluid flow conditions measured by the sensor reach the predetermined threshold,
wherein the spill flow circuit includes a conduit having a first section with a first diameter and a second section with a second diameter smaller than the first diameter,
wherein the first sensor includes a pitot static tube coupled to the second section and extending into an interior defined by the second section to measure a dynamic pressure of the third fuel flow in the second section and the control system is configured to calculate the flow rate of the third fuel flow based on the dynamic pressure of the third fuel flow, and
wherein the pump unit further comprises a main-metering valve located upstream of the second sensor and the inlet to the spill-flow circuit to locate the inlet to the spill-flow circuit between the second sensor and the main-metering valve.

10. The system of claim 9, wherein the pump unit further comprises a pressure drop spill valve and a pressure raising valve, the pressure drop spill valve being configured to maintain a constant pressure differential across the main metering valve by adjusting flow through the spill-flow circuit, the main-metering valve being configured to deliver the first fuel flow to the gas turbine engine based on operating conditions, the pressure raising valve being configured to increase pressure of the first fuel flow to the gas turbine engine.

11. The system of claim 10, wherein the first sensor is coupled to a conduit downstream of the pressure drop spill valve and is configured to determine at least one of pressure and flow rate of the third fuel flow in the conduit.

12. A method comprising
installing a fuel pump in a gas turbine engine;
displacing a fuel flow through a main-flow circuit using the fuel pump;
recirculating a portion of the fuel flow through a spill-flow circuit back to the fuel pump;
sensing fluid flow conditions the fuel flow in the main flow circuit at a first location upstream of an inlet to the spill-flow circuit;
sensing fluid flow conditions of the portion of the fuel flow in the spill-flow circuit at a second location downstream of the inlet to the spill-flow circuit; and
providing a notification that informs a user of an anticipated end of useful life so that the fuel pump can be replaced prior to the end of useful life based at least in part on the fluid flow conditions of the portion of the fuel flow in the spill-flow circuit,
wherein the step of sensing fluid flow conditions of the portion of the fuel flow in the spill-flow circuit includes determining a change in flow rate of the portion of the fuel flow in the spill-flow circuit based on the fluid flow conditions over the life of the fuel pump, and the step of providing a notification occurs when the flow rate of the portion of the fuel flow in the spill-flow circuit reaches a predetermined threshold, and
wherein the spill flow circuit includes a conduit having a first section with a first diameter and a second section with a second diameter smaller than the first diameter,
wherein the first sensor includes a pitot static tube coupled to the second section and extending into an interior defined by the second section to measure a dynamic pressure of the portion of the fuel flow flowing through the second section of the spill flow circuit and the control system calculates the flow rate of the portion of the fuel flow flowing through the spill flow circuit based on the dynamic pressure of the portion of the fuel flow in the second section, and
wherein the gas turbine engine comprises a main-metering valve located upstream of the first location and the inlet to the spill-flow circuit to locate the inlet to the spill-flow circuit between the first location and the main-metering valve.

* * * * *